United States Patent [19]

Conta et al.

[11] Patent Number: 4,675,043
[45] Date of Patent: Jun. 23, 1987

[54] APPARATUS FOR MANUFACTURE OF TUBULAR ELEMENTS FOR INK JET PRINTERS

[75] Inventors: Renato Conta, Ivrea; Remo Rocchi, Turin; Alessandro Scardovi, Ivrea, all of Italy

[73] Assignee: Ing.C. Olivetti & C., S.p.A., Turin, Italy

[21] Appl. No.: 577,340

[22] Filed: Feb. 6, 1984

[30] Foreign Application Priority Data

Feb. 8, 1983 [IT] Italy ............................. 67135 A/83

[51] Int. Cl.⁴ ........................................... C03B 23/20
[52] U.S. Cl. ........................................ 65/160; 65/29; 65/162; 65/271
[58] Field of Search ............... 65/29, 109, 160, 162, 65/271, 285, DIG. 9

[56] References Cited

U.S. PATENT DOCUMENTS 3,556,758  1/1971  Andrews et al. ............... 65/29
3,576,611  4/1971  Obersby ......................... 65/29
3,652,248  3/1972  Loxley et al. ............. 65/DIG. 9
3,874,867  4/1975  Dichter .......................... 65/271
3,985,535 10/1976  Bennett et al. ................ 65/109
4,111,677  9/1978  Andrews ....................... 65/271
4,330,317  5/1982  Vertova ......................... 65/182
4,372,773  2/1983  Halasz .......................... 65/285

FOREIGN PATENT DOCUMENTS 1285111 12/1968 Fed. Rep. of Germany ......... 65/29

OTHER PUBLICATIONS

N. M. Protsenko et al, Steklo: Keramika, p. 12–13, Oct. 1974.

Primary Examiner—S. Leon Bashore
Assistant Examiner—Michael K. Boyer
Attorney, Agent, or Firm—Banner, Birch, McKie & Beckett

[57] ABSTRACT

The apparatus for manufacturing the ink jet glass tubes includes a vertical mandrel which receives the tubes one at a time from a feeder and rotates them relative to a pair of gas nozzles for their heating. The tube is heated in an axially limited intermediary zone so as to form an hour-glass shaped profile.

The profile of the tube is scanned by a television camera which generates two signals indicative of the internal diameter. These are compared electronically with a stored indication of the desired diameter and the two nozzles are rotated into an inactive position when this diameter is reached. The tube is cut along a plane so as to make the profile of the nozzle coincident with a reference profile by a device including an optical device connected to a cutting wheel to permit comparison of the hour-glass profile of the element with the reference profile. The severed end of the tube is then lapped and covered with a non-wettable material. The tubular element is bonded within a piezo-electric transducer, by locating the latter partially in a chamber, after fitting it over the tubular element, while a pump draws an epoxy resin through the chamber and into the space between the transducer and the tubular element.

7 Claims, 12 Drawing Figures

APPARATUS FOR MANUFACTURE OF TUBULAR ELEMENTS FOR INK JET PRINTERS

FIELD OF THE INVENTION

The present invention relates to the manufacture of profiled elements of a material which can be brought to the viscous state. More particularly, the invention can be applied to the manufacture of fluid dispenser devices such as ink-jet printers, each including a tubular body having a terminal nozzle at one end with an orifice of predetermined cross section.

The object of the invention is to make the manufacture of the profiled elements described above easier and more economical while at the same time giving the finished product good characteristics of precision and reliability.

SUMMARY OF THE INVENTION

In order to achieve this object, the present invention provides a method for the manufacture of fluid dispensing devices including a tubular body having a terminal nozzle at one end with an orifice of predetermined cross-section, characterised in that it includes the steps of:

providing a tubular element, of a material which can be brought to the viscous state by heating and having a transverse profile substantially identical to the transverse profile of the tubular body, effecting localised heating of an intermediate zone of the tubular element to bring the material in this zone to a viscous state, causing deformation of the intermediate zone, resulting in a reduction in the cross-section of the internal cavity of the tubular element, observing, during the heating, variations in the cross-section of the internal cavity of the tubular element in order to identify the condition when the cross-section reaches, at least in a transverse plane of the tubular element, a predetermined value substantially corresponding to the cross-section of the orifice of the nozzle of the dispensing device and stopping the heating of the tubular element when this condition is reached.

The invention also provides apparatus for the manufacture of fluid dispensing devices comprising a tubular body having at one end a terminal nozzle with an orifice of predetermined cross-section, from tubular elements of material which can be brought to a viscous state by heating, having a profile substantially identical to the transverse profile of the tube of the body, characterised in that it includes:

heating means which can effect localised heating of a zone of each tubular element in order to bring the material constituting the wall of the tubular element itself to the viscous state and reduce its diameter progressively, and detector means for observing variations in the cross-section of the internal cavity of the said zone of the tubular element during the heating; the detector means being able to identify the condition when the said cross-section reaches, at least in a transverse plane of the tubular element, a predetermined value substantially corresponding to the cross-section of the orifice of the nozzle of the dispensing device and stopping the heating of the zone of the preformed element when the said condition is reached.

The present invention further provides apparatus for the assembly of ink jet printers including an ejector with a tubular body having a nozzle at one end for projecting the ink and an annular transducer fitted onto the ejector with the interposition of a layer of hardenable resinous material in the annular cavity between the ejector and the transducer, characterized in that it includes:

a vacuum source, and a casing defining at least one fluid-tight chamber connectible to the vacuum source; the casing having an aperture for sealingly receiving the transducer with the ejector mounted within it in an arrangement in which a first end of the annular cavity communicates with the vacuum chamber in the casing and the other end communicates with the external environment, whereby the resinous material introduced into the cavity through the other end is drawn into the cavity itself as a result of the low pressure generated in the chamber of the casing.

A further object of the present invention is to provide apparatus for detecting the size of cylindrical pieces subject to working involving variations of the transverse section of the pieces themselves, characterized in that it includes:

television monitor means which can scan a zone of the piece subject to working and subject to variations in its cross-section in order to produce an image having substantial variations of luminance in correspondence with the sides of the scanned piece; the monitor means generating, for each line of the image, a signal presenting sharp variations of amplitude in response to the substantial variations of luminance, and measuring means which can derive an indication of the distance between the sides of the scanned piece from the sharp variations in the signal generated by the television monitor means.

BRIEF DESCRIPTION OF THE DRAWINGS

The invention will now be described, purely by way of non-limiting example, with reference to the appended drawings, in which.

DETAILED DESCRIPTION OF THE INVENTION

Figure 1:
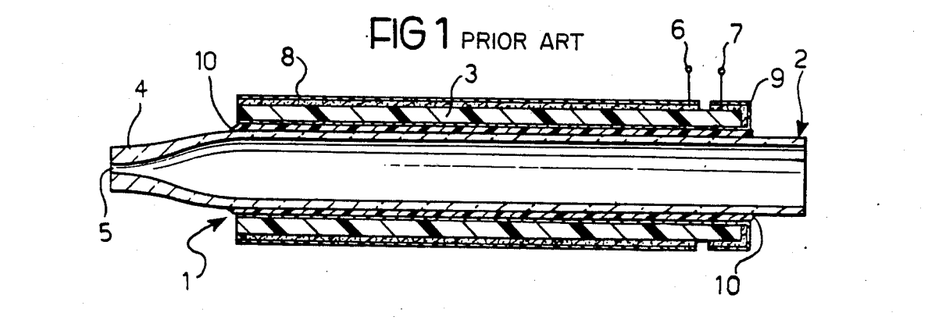
FIG. 1 illustrates an ink-jet printer which can be manufactured by means of the method and the apparatus according to the invention.

In the drawings an ink-jet printer of known type is generally indicated 1 and includes a tubular ejector element 2 onto which a tubular transducer 3 is fitted.

The ejector element 2 is constituted essentially by a capillary tube having a nozzle 4 at one end with a calibrated orifice 5 for projecting the ink. The overall length of the ejector element 2 is about 1.5–2.0 cm and the capillary tube has a diameter of about 1 mm. with a wall thickness of about 5–15 hundredths of a mm. The orifice 5 typically has a diameter of about 5–8 hundredths of a mm. The ejector element 2 is normally made of a vitreous material which can be brought to a viscous state by heating such as, for example, pyrex glass.

The transducer 3 is constituted by a sleeve of piezoelectric material the internal diameter of which is reduced when an excitation voltage pulse is applied between two electrodes 6, 7 connected to respective metallized layers 8 and 9 applied to the outer surface and the inner surface of the transducer 3 respectively.

The annular space between the ejector element 2 and the inner wall of the transducer 3 contains a filling of hardenable resinous material 10 for the transmission of mechanical forces between the transducer 3 and the wall of the ejector element.

When a excitation pulse is applied to the electrodes 6 and 7, the contraction of the transducer 3 causes a corresponding contraction of the wall of the capillary tube. The effect of this contraction is to generate pressure waves within the ink which fills the ejector element 2 in use, which results in the ejection of an ink drop through the orifice 5 of the nozzle 4. A transparent epoxy resin having a low viscosity at ambient temperatures and a low heat generation upon the polymerisation may be used for the connecting layer 10, the polymersation normally being carried out at ambient or lower temperatures in order to avoid residual stresses after polymerisation. These stresses could in fact result in the ejector element 2 breaking away from the transducer element 3, rendering the printer 1 practically unusable.

One example of a resin of the type mentioned above is the resin sold under the trade name STYCAST 1277 made by Emerson and Cumming.

Figure 2:
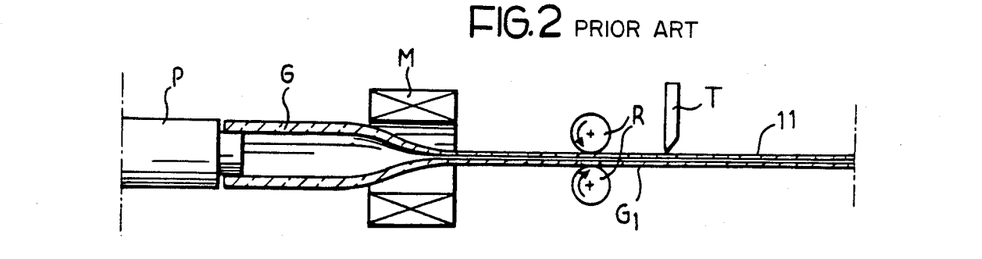
FIGS. 2 to 7 illustrate schematically the steps of the method according to the invention.

FIG. 2 illustrates schematically a device of known type for forming glass capillaries from borosilicate glass tubing such as pyrex glass.

In FIG. 2 a pusher member shown at P advances a borosilicate glass tube G into a heating element (muffle) indicated M.

As a result of the heating effect by the element M the glass of the tube G becomes viscous, which makes it possible to achieve, by means of a pair of counter-rotating rollers R located downstream of the element M, a drawing action which results in the formation of a glass capillary tube $G_1$. A cutter member T, for example a rotary wheel, cuts the capillary tube $G_1$ successively into pieces each of which is indicated 11.

Figure 3:
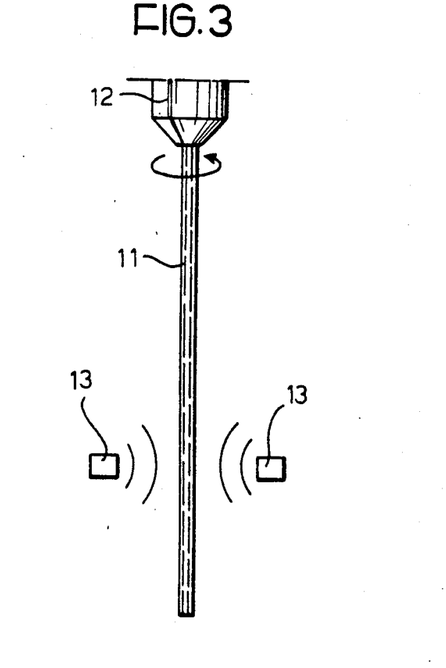
Figure 8:
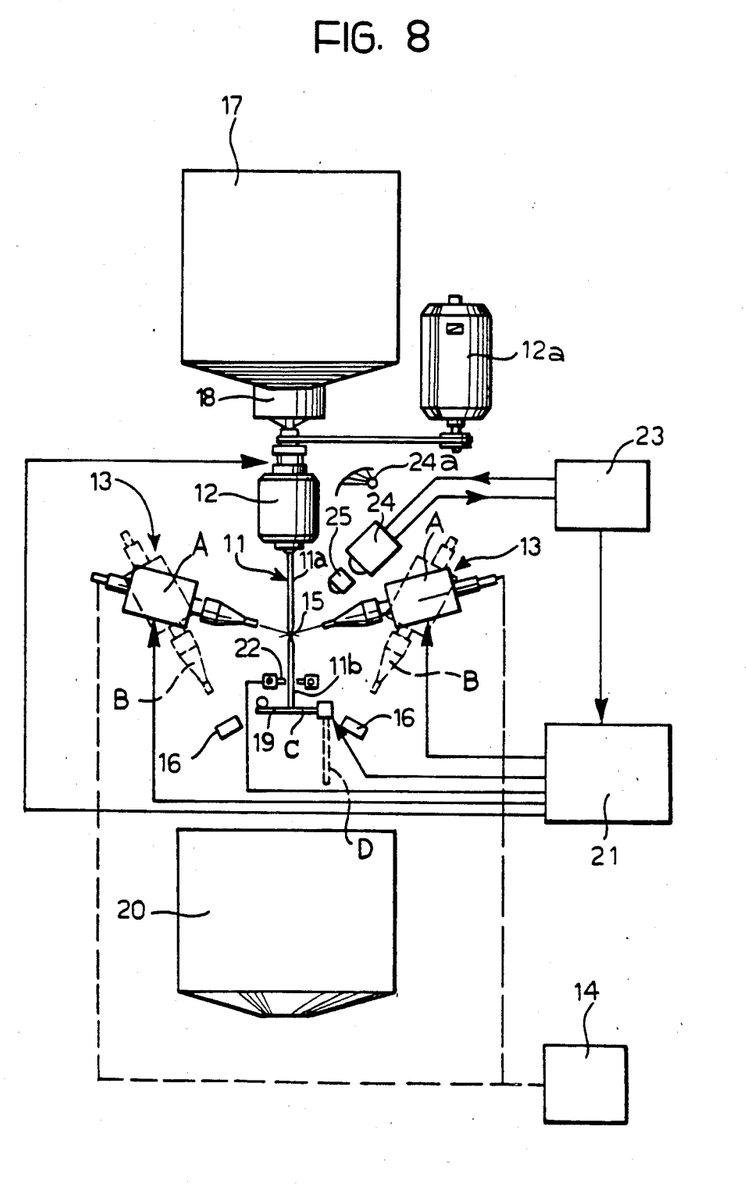
FIG. 8 illustrates first apparatus according to the invention.

In FIGS. 3 and 8 a vertical-axis rotary mandrel indicated 12, receives the upper end of one of the tubular pieces 11.

In the same drawings two localized heat sources are shown at 13 which act on an intermediate portion of the capillary tube piece 11 which is rotated about its axis by the mandrel 12, which is driven by a motor 12a.

In the example illustrated in FIG. 8, the sources 13 are constituted by two hydrogen burner nozzles fed by an electrolytic generator 14.

The use of an electrolytic generator avoids the risks resulting from the use of containers such as cylinders of high pressure hydrogen gas or liquid hydrogen.

Instead of the burners 13, however, it is possible to use a heating element similar to the muffle M used in the device illustrated in FIG. 3 or other equivalent heating elements as the localised heat sources 13.

The use of a plurality of localized sources equi-angularly spaced about the vertical axis of rotation of the pieces 11 of glass capillary is, however, considered preferred at present. More particularly, the use of two opposing burner nozzles together with a speed of rotation of the mandrel 12 of about 20 revolutions per minute is considered the optimum at present.

Each of the nozzles 13 is able to effect an angular movement about a horizontal axis which allows the nozzles 13 to be oriented between an angular working position shown in full outline and indicated A in FIG. 8 and an angular rest position shown in broken outline and indicated B in the same figure.

Figure 4:
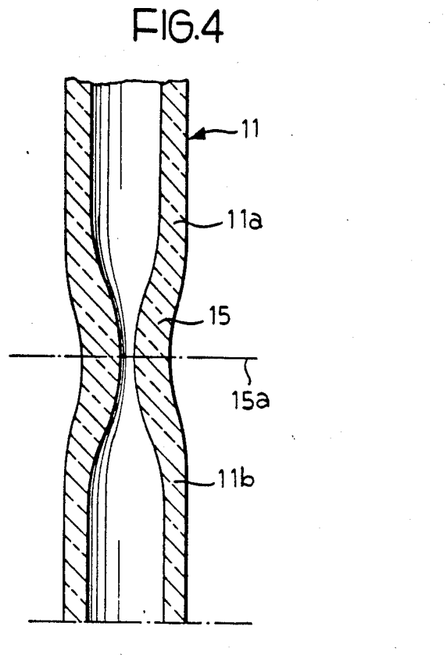

In the angular working position A, the nozzles 13 are directed at the tubular piece 11 fixed to the mandrel 12 and cause localized heating of an intermediate zone of the piece 11 indicated 15 and illustrated on a larger scale in FIG. 4.

In the angular rest position B each of the burner nozzles 13 is directed at a respective monitoring thermocouple 16 which detects the operating temperature of the burner and acts, through a control system, not illustrated, on the generator device 14 in order to regulate the heating action achieved by the burner nozzles 13.

In the embodiment illustrated, the positions of the burner nozzles 13 and of the thermocouple 16 are such that, in the angular rest position B, the mouth of each nozzle 13 is at a distance from the respective monitoring thermocouple 16 equal to that between the mouth of the nozzle 13 itself and the zone 15 of the piece 11 subjected to heating in the angular working position A. This facilitates and makes more precise the control of the operating temperature of the burner nozzles 13 themselves.

A reservoir indicated 17 contains a stock of cut pieces 11 of glass capillary each of which constitutes the tubular starting element for the manufacture of an ejector element 2 of a printer 1 similar to that illustrated in FIG. 1.

The reservoir 17 is disposed above the mandrel 12 and communicates through a vibratory feeder 18 with the axial cavity of the mandrel 12 itself.

The tubular elements (cut pieces) 11 may thus be gravity-fed into the mandrel 12.

The axial fixing position of each preformed element 11 within the mandrel 12 is determined by the bearing of the lower end of the tubular element against a bearing plane 19 located below the mandrel 12.

The bearing plane 19 can be moved from a horizontal working position of engagement with the lower end of the tubular element 11, illustrated in full outline and indicated C in FIG. 8, to a rest position illustrated in broken outline and indicated D in the same figure.

In the rest position D, the bearing plane 19 lies in a vertical plane in order to allow the fall of the tubular element 11 into an underlying collecting receptacle 20 when the tubular element 11 is disengaged from the mandrel 12.

The orientation of the bearing plane 19 is controlled by an electrical control circuit 21 which also controls the movement of the burner nozzles 13, between their working position A and their rest positions B, and the clamping of the mandrel 12.

The control circuit 21 receives signals from an optical sensor 22 which can detect the presence of a tubular element 11 within the mandrel 12 and a detector circuit 23 connected to a television monitor camera 24 which scans the zone 15 of the tubular element 11 subject to the heating action of the burner nozzles 13. The scanned zone is illuminated by a diffuse light source 24a for example a reflection source. Preferably the camera 24 includes an optical magnification system (microscope) indicated schematically 25 in FIG. 8.

The detector circuit 23 is illustrated schematically in FIG. 10 and will be described in detail below.

Figures 5, 6, 7:
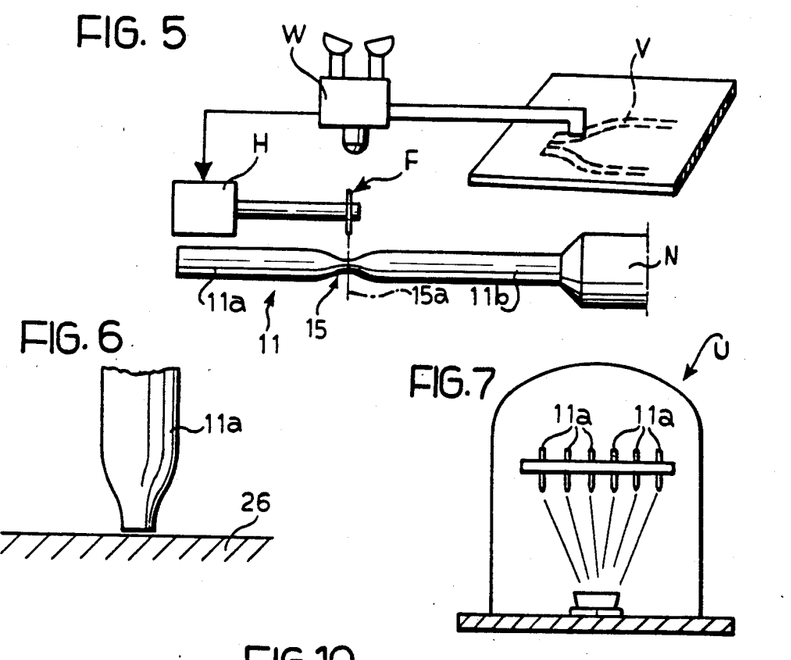

With reference now to FIG. 5, a further mandrel N is intended to rotate a tubular element 11 taken from the receptacle 20 of the apparatus of FIG. 8 slowly about a horizontal axis. This element can be seen to be formed of two portions indicated 11a and 11b and corresponding respectively, when the element 11 is mounted on the mandrel 12, to the portion overlying and the portion underlying the intermediate zone 15.

A high velocity rotary cutter wheel is indicated F for separating the two portions 11a and 11b of the element 11 by cutting in a transverse plane indicated 15a.

The axial position of the wheel F is adjustable by means of a control device H controlled by a viewer W which allows the intermediate zone 15 of the element 11 mounted on the mandrel N to be observed and the image thus obtained to be superimposed on an image corresponding to a reference shape V which reproduces the shape of the nozzle 4 of ejector element 2 of the printer 1. In FIG. 6 a rotary plate 26 is shown which effects the lapping of the end face of the portion 11a of the element 11 corresponding to the ejector element 2 of the printer 1.

In FIG. 7 apparatus generally indicated U is shown for the deposition of metal evaporated under vacuum on the end face of the portion 11a of the tubular element 11 as a layer of anti-wetting material which can thus prevent the deposition of ink of the end face.

In use of the apparatus according to the invention, the tubular elements (cut of pieces 11) made by the device illustrated in FIG. 2 are loaded into the reservoir 17.

The vibratory feeder 18, under the control of the circuit 21, introduces the elements 11 sequentially into the mandrel 12 by making them fall into the mandrel 12 in its open position. The falling movement of each element 11 is arrested by the impingement of the lower end of the element 11 against the bearing plane 19 which, at the beginning of each working cycle of each tubular element 11, is in the horizontal working position C.

Immediately the optical sensor 22 detects that a tubular element 11 has been supplied to the mandrel 12, the control circuit 21 initiates the clamping of the mandrel 12 and the tipping of the bearing plane 19 downwardly into its vertical rest position D.

The mandrel 12 is subsequently rotated by means of the motor 12a while the gas nozzles 13 are brought from their angular rest positions B in which they are located originally to their working positions A in which the nozzles 13 effect localised heating of the intermediate zone 15 of the tubular element 11. In their working position A the nozzle 13 must be inclined to the axis of the mandrel in order to avoid the two flames interfering with each other. Preferably this angle is chosen to be about 60°.

As a result of the heating, the vitreous material constituting the wall of the portion 15 becomes viscous whereby, on the basis of known physical laws, the internal diameter and the outer diameter of the intermediate zone 15 of the element 11 are reduced, with a simultaneous increase in the thickness of the wall of the zone itself.

As a result of the heating the intermediate zone 15 of the element 11 thus gradually assumes the deformed hour-glass configuration illustrated schematically in FIG. 4.

The heating of the zone 15 is continued until, as a result of the deformation consequent on the vitreous material constituting the wall of the tubular element 11 changing to the viscous state, the diameter of the internal cavity of the tubular element 11 in the zone 15 reaches a value substantially corresponding to the diameter of the nozzle 5 of the ejector element 2 of the printer 1.

For the purposes of the invention it suffices for this condition to occur solely in a transverse plane of the tubular element 11. However it is preferred, for reasons which will be better described below, to achieve this condition over a certain axial length, of the tubular element itself by a suitable choice of thickness of the tube or variation of the location and inclination of the nozzles 13.

During the heating of the intermediate zone 15 the tubular element 11 is rotated by the mandrel 12 which supports the element 11 itself at its upper end so that the intermediate zone 15 which is being heated keeps its symmetry about its central axis even in the deformed hour glass configuration.

In order for the hour-glass shape to assume the desired length, the length of the tubular element and the position of the nozzles 13 are selected so that the portion 11b of the tubular element 11 beneath the zone 15 subjected to heating has a length such that the strength of the gravitational force on this portion annuls the transverse thrust due to the internal stresses generated in the material in the zone 15 which is in the visous state or balances them after this zone 15 has been moved vertically by a predetermined amount.

The correct selection of the position of the zone 15 subjected to heating is particularly important since the centrifugal forces resulting from the rotation of the tubular element 11 could have an amplifying effect on deviations of the portion 11b from the axis of the element 11 itself. The weight of the portion 11b must be such as to rectify any deviations caused by the internal stresses along the axis of the tube 11 in the zone 15.

The condition described above establishes a lower limit for the distance between the zone 15 and the lower end of the element 11. The upper limit for this distance is determined by the need to avoid the strength of the gravitational forces acting on the portion 11b being able to bring about excessive axial stretching of the wall of the zone 15 during the heating.

Given the material and the size of the ejector 2 of the printer 1 indicated above, it is preferable to choose value for the distance between the intermediate zone 15 and the lower end of the tubular element 11 of between 40 and 60 mm.

The progressive deformation of the zone 15 subjected to heating may be monitored continuously through the television camera 24 both by observation of the image produced thereby by an operator and through the detector circuit 23.

It is thus possible to discern when the degree of narrowing of the internal cavity of the tubular element has reached the desired level in the zone 15.

At this point it is possible to rotate the burner nozzles 13 towards their rest angular positions B so as to stop the heating by means of a command imparted manually to the control circuit 21 by an operator and by a signal passed to the circuit 21 by the detector circuit 23.

After a brief pause to allow the solidification of the wall of the intermediate zone 15 of the tubular element 11, the mandrel 12 is opened allowing the element 11 with its hour-glass shaped intermediate portion 15 to fall into the collecting receptacle 20.

The bearing plane 19 is then returned to the horizontal position C so as to allow a new tubular element 11 to be fed to the mandrel 12 from the reservoir 17 through the feeder 18 in order to start a new working cycle.

The tubular element 11 taken from the collecting receptacle 20 is transferred to the apparatus illustrated in FIG. 5 in which the lower end 11b of the element, which will be discarded, is mounted on the mandrel N.

It is possible to divide the element 11 into two separate portions by cutting the wall in correspondence with the plane 15a by means of the wheel F the axial position of which relative to the element 11 mounted on the mandrel N can be adjusted through the device H controlled from the viewer W.

The position of the cutting plane 15a is selected by comparison of the profile of the hour-glass zone 15 with the reference shape V which, as indicated above, reproduces the profile of the nozzle 4 of the printer element 1.

It is thus possible to carry out the cutting of the nozzle to a predetermined length with high precision, account being taken of the fact that nozzles which are too short result in the generation of ink drops in association with an excessive number of smaller size spurious droplets (satellites). Nozzles which are too long have too high an hydraulic impedance. The comparison of the zone 15 subject to cutting with the reference V also allows pieces with manufacturing defects to be discarded.

As indicated above, the zone 15 has diameters substantially corresponding to the diameters of the orifice 5 of the nozzle 4 over a certain part of its length. There is thus a field of choice for effecting the cutting of the element 11 in correspondence with an optimum plane 15a having regard to the performance of the ejector device 2.

After the portion 11a of the element 11 has been separated from the portion 11b which is to be discarded, the front face thereof surrounding the nozzle 5 is subjected to lapping as shown schematically in FIG. 6.

The lapping is preferably effected using a tinor lead-based rotary plate 26 to the surface of which is fed a diamond paste with a grain size of less than 1 micron.

At the end of the lapping, each portion 11a is cleaned and after this its internal diameter is checked and any chipping of the wall of the portion itself is looked for.

The portions 11a are subsequently mounted in the apparatus U of FIG. 7 for the vacuum-deposition on the front face thereof which has been lapped of a layer of material (anti-wetting material) for preventing the deposition of the ink on the front face during use as the ejector in an ink jet printer.

In order to apply the layer of anti-wetting material, which is normally a chromium, nickel-chromium and/or cobalt-chromium based material, it is also possible to use cathode sputtering apparatus in which the end faces of the portions 11a act as the targets.

After the deposition of the layer of anti-wetting material each portion 11a, after possible cutting of the end opposite the narrowed end, assumes the final configuration which allows its use, after coupling to a corresponding transducer 3, as an ejector element 2 in an ink jet printer.

Figure 9:
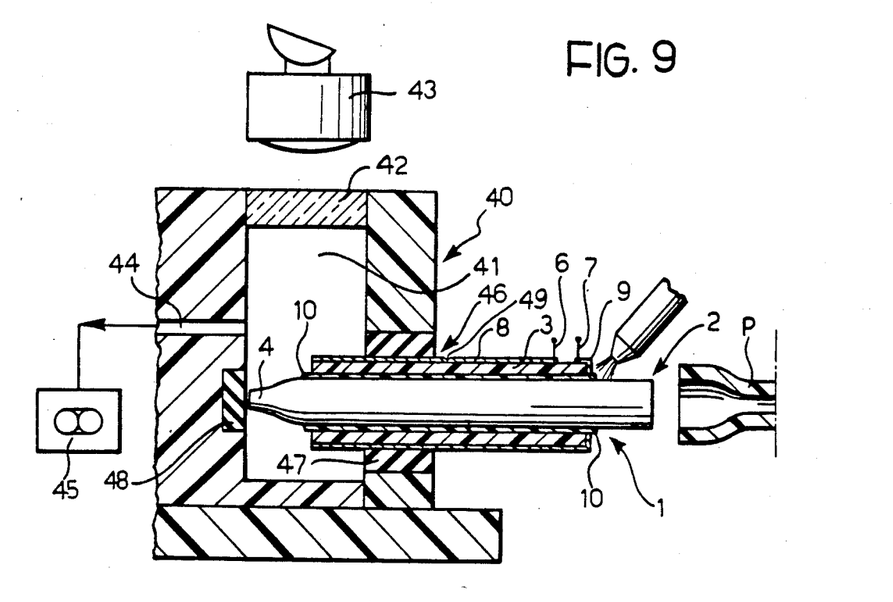
FIG. 9 illustrates schematically further apparatus according to the invention.

The coupling of the ejector 2 and the transducer element 3 is achieved by means of the apparatus illustrated in FIG. 9 in which a casing is shown generally indicated 40 defining a fluid-tight chamber 41 which can be inspected visually through a transparent wall 42 with the aid of a viewer 43.

The casing 40 may usefully be made of a block of material such as plexiglass in which a blind hole defining the chamber 41 is formed.

The open end of the hole is then sealed by means of a stopper of transparent material such as plexiglass or glass which constitutes the wall 42. The stopper may be shaped like a lens in order to facilitate the optical inspection of the chamber 41.

It is also possible to form a plurality of chambers 41 in a single block of material in the manner described above so as to allow the simultaneous assembly of a plurality of jet printers.

A duct 44 puts the chamber 41 in communication with a vacuum pump 45 which can create a controlled low pressure within the chamber 41 itself.

A further aperture 46 allows the introduction into the chamber 41 of one of the ends of the transducer 3 in which the ejector element 2 is inserted.

The parts and the elements constituting the ejector 2 and the transducer 3 are indicated in FIG. 9 by the same references as used in FIG. 1.

A washer 47 is fitted to the edge of the aperture 46 to ensure sealing between the casing 40 and the outer wall of the transducer 3.

48 indicates an insert of resiliently yieldable material such as the material known as "silastic" which is aligned with the aperture 46.

The arrangement is such that the ejector 2 may be made to slide longitudinally until the nozzle 4 is brought to bear against the insert 48. Under these conditions the orifice 5 of the nozzle 4 is closed and the ejector element 2 is fixed to the casing 4 in a predetermined position.

This allows the adjustment of the axial position of assembly of the transducer 3 on the ejector element 2 very precisely.

This may be achieved, for example, by aligning a reference notch 49 provided on the outer surface of the transducer 3 with the outer edge of the aperture 46.

In the assembled disposition described, the annular cavity between the ejector 2 and the transducer 3 communicates at the end corresponding to the nozzle 4 of the ejector 2 with the chamber 41 and at its opposite end with the external environment.

Figure 10:
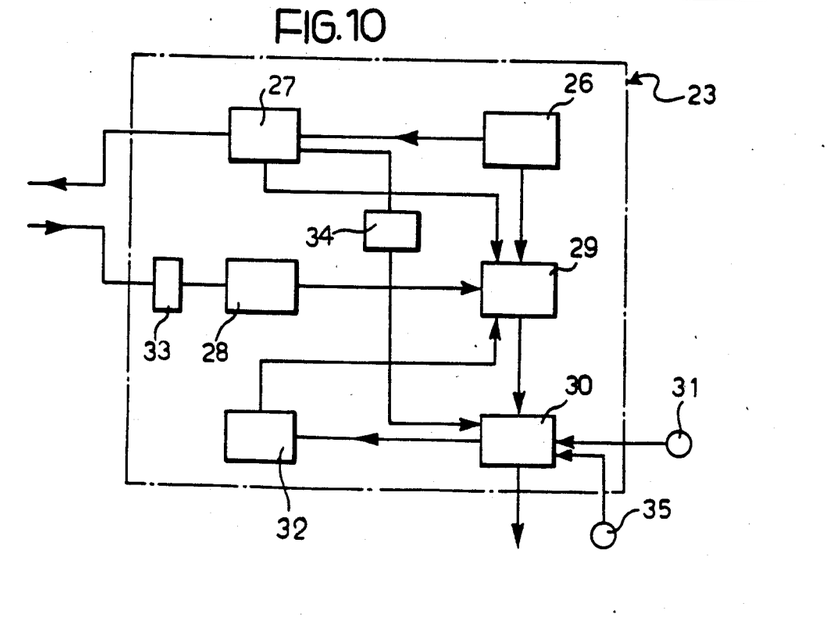
FIG. 10 is a block schematic diagram of the internal structure of one of the components of FIG. 8.

This cavity may then be filled with resinous material 10 by feeding the material itself into the end of the cavity projecting from the casing 40 as shown schematically in FIG. 10, the pump 45 being operated simultaneously to create a low pressure within the chamber 41.

As a result of this low pressure, the resinous material 10 is gradually drawn into the cavity. The value of the low pressure within the chamber 41, and consequently the speed with which the material 10 fills the cavity between the ejector 2 and the transducer 3, can be adjusted so as to achieve gradual filling of the cavity itself, avoiding the formation of bubbles or irregular distribution of the material within the filling layer.

Observation of the end of the printer 1 which is within the chamber 41 through the viewer 43 makes it possible to identify when after the chamber between the ejector 2 and the transducer 3 has been filled completely, the resinous material 10 emerges from the end of the cavity corresponding to the nozzle 4.

At this point the pump 45 may be stopped to allow the hardening of the layer of resinous material 10.

This hardening is normally carried out at ambient temperature over a period of about 24 hours. In order to ensure complete hardening it is, however, preferable to subject the device 1 to a final heating phase at a moderate temperature (40°–60° C.) for a period of about 2 hours.

The printer 1, thus completed, can be connected to an ink supply tube indicated P in FIG. 9, of plastics material such as polyvinylchloride.

The connection of the tube P to the ejector element 2 is normally effected by means of a heat-shrinking sleeve (not illustrated) constituted, for example, by a piece of heat-shrinkable tube sold under the trade name RAYCHEM RNF-3000 or a piece of the tube sold under the trade name RAYCHEM UTUM.

FIG. 10 illustrates the internal structure of the detector circuit 23 of FIG. 8.

This circuit, together with the television camera 24 is usable in general for monitoring the diameter of cylindrical pieces subjected to working involving variation in the cross section of the pieces themselves. In addition to the formation of the hour-glass shaped zone 15 of the elements 11 the detector circuit 23 may also be used for the manufacture of tubes of plastics material (for example the tube for supplying the ink indicated P in FIG. 9), optical fibres and the like.

Figure 12:
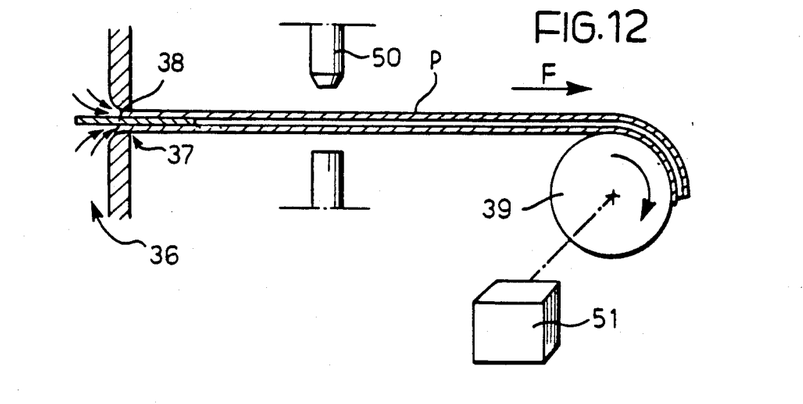
FIG. 12 illustrates an alternative form of the apparatus of FIG. 8.

FIG. 12 shows schematically a variant of the apparatus of FIG. 2 for manufacturing such a tube. It is formed in an extrusion process by a device 36 including an orifice 37 and a core 38 which roughly define the outer diameter and the inner diameter respectively of the plastics tube P.

The final values assumed by these outer and inner diameters are, however, considerably influenced by the pulling force F exerted, for example by the winding reel 39. The tube P is monitored by a television camera 50, similar to the camera 24 of FIG. 8, which observes the outer diameter, or the inner diameter if the plastics material constituting the tube P is transparent, and provides the feedback signal for an operating mechanism 51 for the winding reel 39 to drive the latter so as to apply a force to the tube P such as to reduce its inner diameter or outer diameter until the value established by the operator is reached.

FIG. 10 shows an oscillator 26 which controls the television camera 24 of FIG. 9 through a horizontal sync generator 27, the camera being oriented so as to scan the portion 15 of the tubular element 11 subjected to heating.

The electrical signal generated by the camera 24 is characterized by variations in amplitude which correspond to the variations in luminance detectable in the scanned visual field.

In the application to the observation of the intermediate zone 15 of the element 11, which is constituted by a transparent vitreous material, these variations in luminance are present at the outer sides and the sides of the internal cavity of the tubular element 11. When the piece observed is made of an opaque material, the said variations in luminance are normally present only at the outer sides of the scanned piece.

In each case the variations in luminance are more easily detectable when the piece to be observed is illuminated with diffuse light such as that produced by the reflected light source 24a of FIG. 8. This avoids the surface of the object observed causing reflections which hinder the detection effected by the camera 24. A squaring amplifier to which the signal produced by the camera 24 is fed is shown at 28.

Figure 11:
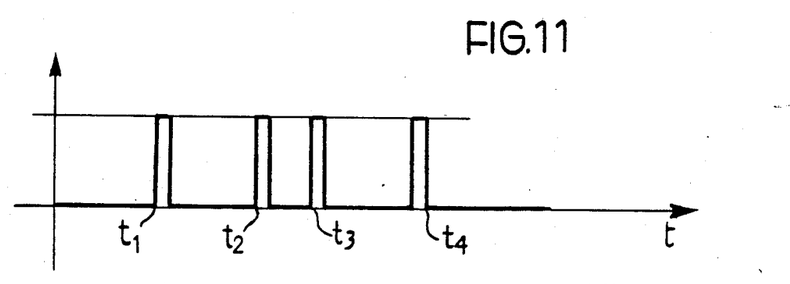
FIG. 11 illustrates typical changes with time of a signal generated within the block schematic component of FIG. 10.

In the application illustrated in FIG. 8, in which the piece scanned is a tubular element of transparent material, the signal coming from the camera 24 assumes the form illustrated in FIG. 11 for each line of the image and after the squaring operation carried out by the amplifier 28.

In this signal four rectangular pulses can be seen in correspondence with the instants indicated $t_1$, $t_2$, $t_3$, and $t_4$.

More particularly, the first and last pulses ($t_1$, $t_4$) indicate the presence, in the image produced by the camera 24, of two fringes generated by the total reflection of the light at the glass-air interface in correspondence with the outer sides of the tubular element 11.

The other two pulses ($t_2$, $t_3$) correspond to similar fringes located at the sides of the inner cavity of the tubular element 11 itself.

The separation between the "outer" pulses ($t_1$, $t_4$) is thus indicative of the outer diameter of the tubular element while the separation between the "inner" pulses ($t_2$, $t_3$) indicates the inner diameter of the tubular element with an error due to refraction in the material. This error may be corrected for each time in dependence upon the material by means of a calibration circuit 33 (FIG. 10). For convenience below the signals $t_2$, $t_3$ will be understood as the corrected signals and their separation indicates the diameter of the inner cavity of the tubular element 11 itself.

In an entirely similar manner, the separation between the pulses occurring at the instants $t_1$ and $t_2$ and the separation between the pulses occurring at the instants $t_3$ and $t_4$ are both indicative of the thickness of the wall region of the tubular element 11 scanned by the camera 24.

Differences between these two values of separation, and any phenomena of overall fluctuation of the position of the pulses, may be indicative of the existence of irregularities or asymmetry in the tubular element 11.

The output signal of the amplifier 28 is fed to a counting and timing block 29 which is synchronized with the scanning action effected by the camera 24 through a frequency signal from the generator 27.

Thus the counting and timing block 29 is able to convert the information relative to the separation of the pulses which appear in the output signal of the squaring amplifier 28 into one or more signals indicative of the transverse dimensions of the piece observed. More particularly, in the embodiment illustrated, the block 29 outputs a signal proportional to the separation between the pulses occurring at the instants $T_2$ and $t_3$.

The output signal indicative of the internal diameter of the tubular element 11 is selected through an external control 31 for passing to a comparator 30 where it is compared with a reference level which is adjustable by means of a detector circuit 23 through the external control 31 according to the internal diameter desired for the nozzle orifice 5 (FIG. 1).

As indicated above, the television camera 24 produces a signal the form of which is illustrated in FIG. 11 for each scanning line of the image. A line counter block 34 is able to select, from all the line signals of an image, that corresponding to the transverse plane and the zone of the tubular element 11 in which it is desired to check the inner diameter of the tubular element. However, when it suffics to determine the operation on the basis of the minimum value of the diameter one may enable the counter 29 to feed to the comparator 30 all the signals generated. It is, however, possible to use various selection criteria in dependence on particular requirements of use. More particularly, when the piece of be formed is made of a material which is opaque to light a signal output by the counter 29 which is proportional to the separation of the signals occurring at the instants $t_1$ and $t_4$ (FIG. 11) is selected for passing to the comparator 30 by means of a second external control 35.

When the signal received by the comparator 30 falls below the reference level input of the comparator 30, the comparator 30 itself outputs a signal which is fed to the control circuit 21 to control, as described above, the movement of the burner nozzles 13 to their rest position and the consequent stoppage of the heating of the region 15 of the tubular element 11. This obviously occurs when the diameter of this region has reached a predetermined value selected by operation of the control 31 or 35.

By 32 is shown an anti-noise logic of known type arranged to exclude any spurious signal generated by the counter 29 in a random manner during the scanning. The logic 32 thus allows the counter 29 to output only the signals generated with a certain repetitiveness. For this purpose the logic 32 is interposed between the comparator 30 and the block 29, preventing the erroneous and undesirable switching of the comparator 30 as a result of noise signals coming from the block 29.

Naturally, the principle of the invention remaining the same, constructional details and embodiments may be varied widely with respect to that described and illustrated without thereby departing from the scope of the present invention. For example the control system with the television camera 24 may be used for various applications with or without the microscope and with continuous illumination or stroboscopic illumination. The circuit 23 may also be connected to a visual display screen and possibly to a processing computer.

What is claimed is:

1. An apparatus for shaping a nozzle of a tubular ejector of an ink jet printing device, the ejector being shaped from a tubular element having a diameter substantially equal to the diameter of the ejector and formed of a transparent material which can be brought to a viscous state by heating, the nozzle being formed of half an hourglass portion having a capillary orifice, said apparatus comprising:

a vertical axis, rotary mandrel having an axial cavity operable for gripping an upper end of one of the tubular elements;

means disposed above said mandrel for individually gravity feeding the tubular elements into the axis cavity of said mandrel;

a bearing element having a horizontal plane located beneath said mandrel in a fixed axial stopping position for stopping the axial movement of the tubular element fed into said mandrel, said bearing element capable of moving away from the stopping position to a position for allowing the tubular element to drop gravitationally from said mandrel;

a plurality of heating means equiangularly spaced about the vertical axis of said mandrel, said heating means being arranged to effect localized heating in a limited zone between said mandrel and said bearing element to bring material constituting an intermediate portion of the wall of the tubular element located within said zone to a viscous state while the tubular element is rotated by said mandrel, said heating means being located in a position to define a portion of the tubular element below said zone having a weight sufficient to cause transverse stresses on the tubular element which combine with gravitational forces to progressively reduce the cross-sectional area of the tubular element within said zone and form the hour-glass portion;

optical detector means sufficiently located with respect to said heating zone for detecting variations of luminance of the visual field in said zone during heating, and generating a measurement indicating when the inner diameter of the tubular element in a transverse plane of said zone reaches a desired value; and means for stopping the heating within said zone when the desired inner diameter of the tubular element is attained, said means controlled by said optical detector.

2. Apparatus as defined in claim 1, wherein each one of said heating means comprises a gas burner having a working position inclined a predetermined angle with respect to the axis of said mandrel and further including electrolytic means for generating hydrogen, connected to the burner nozzles to supply hydrogen thereto, and a thermo-couple associated with said burner nozzles for so controlling said electrolytic means to cause said burner nozzles to produce a predetermined temperature.

3. Apparatus as defined in claim 2, wherein each of the nozzles has means for pivotally mounted for angular movement about a horizontal axis between said working position in which the nozzles is directed at the tubular element and an angular rest position in which the nozzle is directed at its associated thermo-couple for monitoring its operating temperature.

4. Apparatus as defined in claim 3, wherein the distance between the mouth of each burner nozzle and its associated thermo-couple in the said angular rest position is equal to the distance between the mouth of said nozzle in said working position and said heating zone.

5. Apparatus as defined in claim 1, wherein the relative position of said heating means and said bearing element are selected so that the portion of the tubular element below the zone subjected to heating has dimensions such that the strength of the gravitational forces on this portion prevent the portion from moving relative to the axis of the tubular element as a result of the internal stress present in said zone, without giving rise to any substantial axial stretching in said zone.

6. Apparatus as defined in claim 1, wherein said bearing element includes means for disengaging said bearing element from the lower end of the tubular element resting thereon after the tubular element has been clamped in said mandrel.

7. Apparatus as defined in claim 1, wherein said optical detector means include a camera for detecting luminance and to generate electric signals a sync generator for causing said camera to cyclically scan the section of the tubular element within said zone, defining variations in luminance in the scanned visual field, counting means responsive to said electric signals and said sync generator for generating a dimensional signal of the diameter of the section of the tubular element within said zone, means operable for causing said counting means to generate said electrical signals in response to the variation of luminance of the internal cavity of the section of the tubular element within said zone, and comparing means for comparing said dimensional signal with a predetermined reference signal for generating said measurement indication.

* * * * *